United States Patent [19]

Akao

[11] 4,452,846
[45] Jun. 5, 1984

[54] FILM FOR PACKAGING LIGHT-SENSITIVE MATERIALS

[75] Inventor: Mutsuo Akao, Minami-ashigara, Japan

[73] Assignee: Fuji Photo Film Co., Ltd., Minami-ashigara, Japan

[21] Appl. No.: 463,239

[22] Filed: Feb. 2, 1983

[30] Foreign Application Priority Data

Feb. 3, 1982 [JP] Japan .................................. 57-14762

[51] Int. Cl.³ .......................... B32B 27/00; B32B 5/16
[52] U.S. Cl. ..................................... 428/220; 428/290; 428/323; 428/328; 428/461; 428/500; 428/511; 428/513; 428/515; 428/516; 428/537.5
[58] Field of Search ............... 428/457, 461, 500, 515, 428/516, 913, 347, 349, 290, 35, 323, 328, 511, 513, 537

[56] References Cited

U.S. PATENT DOCUMENTS

| | | | |
|---|---|---|---|
| 4,172,915 | 10/1979 | Sheptak et al. | 428/461 X |
| 4,311,742 | 1/1982 | Otsuka | 428/461 X |
| 4,337,285 | 6/1982 | Akao et al. | 428/461 X |
| 4,337,298 | 6/1982 | Karim et al. | 428/461 |

*Primary Examiner*—Thomas J. Herbert, Jr.
*Attorney, Agent, or Firm*—Burns, Doane, Swecker and Mathis

[57] ABSTRACT

A film for packaging light-sensitive materials has at least one light-shielding film comprising polyethylene polymer and not less than 1 weight % of light-shielding material, wherein not less than 50 weight % of the total polyethylene polymer is linear low density polyethylene (L-LDPE). At least one additional layer of thermoplastic resin film, flexible sheet or aluminum layer may be provided.

25 Claims, 15 Drawing Figures

FILM FOR PACKAGING LIGHT-SENSITIVE MATERIALS

BACKGROUND

The present invention relates to a polyethylene film for packaging mainly light-sensitive materials, in particular, to a laminated film comprising linear low density polyethylene (hereinafter referred to as L-LDPE).

Polyethylene film has widely been employed as a packaging material, among which films employable have been polyethylene produced by a high pressure process (referred to "LDPE" hereinafter) and ones produced by a low/moderate pressure processes. Recently, L-LDPE a so-called third polyethylene having advantages of both high and low/moderated pressure polyethylenes has become commercially available. This L-LDPE attracts attention of those skilled in the art due to its low cost and high strength, which may meet the requirements for saving energy and resources.

However, L-LDPE has such a low transparency that as a general packaging film it may not be replaced for LDPE and has been considered difficult to be used owing to its poor processing properties even in a packaging film requiring no transparency. That is to say, L-LDPE which is a copolymer of ethylene with other α-olefin(s) requires not only an extra energy to form the film, but also installation of a new molding machine or replacement of existing molding machines.

Packaging materials completely intercepting light are used for packaging light-sensitive materials which will cause their quality and value to deteriorate on exposure to light. Such packaging materials must have excellent light-shielding properties; physical strengths such as breaking strength, tear strength, extent of impact perforation; Gelbo test strength etc.,; heat seal properties such as heat seal strength and hot seal strength; antistatic properties and the like. It is difficult to provide a single film material which possesses all the above-mentioned properties. Therefore, composite laminated films composed of a LDPE film comprising carbon black or pigments dispersed therein, and a flexible sheet such as paper, aluminum foil, cellophane etc. have heretofore been used in the art.

Such laminated films do not have sufficient physical properties and have disadvantages in that they are readily torn or pinholed during packaging work and in that heat sealed portions are readily separable. Furthermore incorporation of a great quantity of light intercepting material referred to "light-shielding material" hereinafter such as carbon black tends to reduce the physical strengths to a great extent. Thus the amount of the light-shielding material should be limited to about 3 weight % and the thickness of film should be not less than 70 μm resulting in that the film becomes so bulky and rigid as to entail a poor processing properties on packaging and a high manufacturing cost.

SUMMARY OF THE DISCLOSURE

Accordingly, it is an object of the present invention to provide a novel packaging material.

It is another object of the present invention to provide a novel L-LDPE packaging material free from the above-mentioned disadvantages.

It is a further object of the present invention to provide an L-LDPE packaging material superior in light-shielding properties, moistureproofness, physical strengths, gas-shielding properties, antistatic properties, heat seal properties as well as good processing properties or packaging.

The present invention provides a film for packaging light-sensitive material having at least one light-shielding layer comprising polyethylene polymer and not less than 1 weight % of light-shielding material, not less than 50 weight % of total polyethylene polymer being linear low density polyethylene (L-LDPE).

Although it is preferable that the balance of the polyethylene polymer other than L-LDPE includes high pressure low density polyethelene (LDPE) manufactured by the high pressure process, polyethylene polymer other than those hereinabove mentioned may be partially present as far as the principal characteristics are not changed.

DETAILED DESCRIPTION OF THE PREFERRED EMBODIMENTS

Figure 1:
FIGS. 1 to 3 are sectional views showing examples of conventional packaging films.

The term "polyethylene polymer" used herein includes L-LDPE as well as polyethylene manufactured by conventional process, e.g., high pressure process and low/moderate pressure processes. L-LDPE is a low/moderate density polyethylene copolymer having short branched chains on a linear chain which may be produced by copolymerizing ethylene with α-olefin having 3–13, preferably 4–10 carbon atoms at low pressures.

Commercially available L-LDPE are in the trade names: Unipol(U.C.C.), Dowlex (Dow Chemical Co., Ltd.), Sclair (DuPont Canada Inc.) Marlex (Phillips Co., Ltd.) and Ultzex (Mitsui Petroleum Chemical Industries Co., Ltd.). E.g., 1-butene, 1-octene, 1-hexene, 4-methyl-1-pentene are used as α-olefin. The quantity of the α-olefin approximately ranges from 0.5 to 10% by weight of L-LDPE.

The density of L-LDPE is in general understood to be similar to that of low/moderate pressure polyethylene while many of commercially available L-LDPE products fall within the density approximately ranging from 0.91 to 0.95. L-LDPE has been considered unsuitable for packaging film due to its poor transparency and processing properties despite its superiority in strength compared to LDPE.

The light-shielding material encompasses particulate and powdery material incorporated and dispersed in polyethylene polymer, which material does not transmit visible light (and ultraviolet rays).

Particularly, the light-shielding material encompasses inorganic and organic pigments such as carbon black, iron oxide, zinc oxide, titanium oxide, aluminum powder, aluminum paste, calcium carbonate, barium sulfate, cadmium pigments, chrome yellow pigments, red oxide, cobalt blue, copper phthalocyanine pigments, monoazo or polyazo pigments, aniline black and the like.

It has been well known to incorporate the light-shielding material in polyethylene. By incorporating carbon black etc in polyethylene the light intercepting ability will certainly increase with the increase in carbon black amount whereas various physical strengths deteriorate. Thus carbon black should be limited to about 3% and the film thickness should be not less than 70 μm in order to compensate for the reduced strength on the case where carbon black is used in the film for packaging light-sensitive material.

Accordingly resultant package got bulky, the film became highly rigid resulting in poor processing properties on packaging, and a problem arose even with respect to saving in resources.

In the present invention, in lieu of conventional polyethylene, L-LDPE has been tested on the influences of the carbon black incorporation, although L-LDPE was construed unsatisfactory as a film for packaging. The tests have revealed an unexpected result that the incorporation of carbon black in L-LDPE will significantly enhance the physical strength unlike the case of LDPE.

The results are shown in Table 1. LDPE inherently has a lower strength in comparison with L-LDPE and suffers noted decrease in strength particularly when the carbon black is added. In contrast to this, L-LDPE highly improves in the strengths due to the carbon black incorporation.

Carbon black becomes clearly effective at 1 weight % and significant in excess of 3 weight %, whereas its further increase will enhance formation of fisheyes, i.e., particulated gel portions of the like spots, and will entail an increase in manufacturing cost. If carbon black is exceeding 30 weigth % a lot of fisheyes are formed particularly due to unsatisfactory dispersion of carbon black resulting in unacceptable poor light-shielding ability due to pinholes, additionally accompanying an increased cost.

Accordingly it is preferable that carbon black amounts to 1–30 weight %, particularly 3 to 20 weight % from the view point of economy, fisheye formation and tear strength. This tendency holds good for the other light-shielding materials as well.

The manner of incorporating carbon black into polyethylene polymer is not particularly limited, but a masterbatch process mentioned hereinbelow is preferable:

A masterbatch is prepared by mixing not less than 2 weight %, generally 10 weight % or more of carbon black with LDPE. This masterbatch is weighed and mixed with L-LDPE so that finish product contains a given amount of carbon black.

This process has two advantages. Firstly mixing and dispersing is easier than that in the case of direct mixing of carbon black into L-LDPE. Manufactung cost is reduced and fisheye formation is avoided.

Secondly, a mixture of LDPE with L-LDPE has good processing properties on film manufacturing which are far improved one that of L-LDPE alone. L-LDPE may be used as a masterbatch resin for reducing the cost of carbon black to be admixed. These hold good for the case in which other light-shielding materials are used.

Melt tensile stress and fluidity characteristics are major problems of L-LDPE. Production of L-LDPE film does not only require higher energy than the case of conventional polyethylene, but also requires modification, replacement or even new installation of existing inflation molding machines.

With respect to this point, a process is disclosed, e.g., in JP-patent Kokai-publication No. 55-117638, wherein the screw structure is changed for reducing heat generation due to rotation by decreasing the load upon the screw.

The inventive film may be produced by a masterbatch process wherein existing T dies and inflation molding machines can be used without conversion provided that not less than 5 weight % LDPE is contained in the polyethylene.

Although it may be preferable from the point of view of mere processing properties that L-LDPE be as little as possible, the high increase in the strengths caused by carbon black will not be achieved if the amount of LDPE is larger than that of L-LDPE. Therefore, the amount of L-LDPE in total polyethylene polymer should be 50 to 100 weight %, preferably not less than 60 weight %. Increase in processing properties is effective merely due to incorporation of LDPE, besides a further increase in bubble stability is attained due to additional influence of the incorporation of the light-shielding materials.

Furthermore, polymer blend has excellent requisite physical properties such as tear strength, heat seal strength and Gelbo test strength. The data are shown in Table 2.

TABLE 1

Properties of Single Inflation Films
(film thickness 50 μm)

| | Reference Tests (prior art films) | | | | Films of the Present Invention | | | | |
|---|---|---|---|---|---|---|---|---|---|
| Sample No. | R1 | R2 | R3 | R4 | | 5 | 6 | 7 | 8 | 9 |
| L-LDPE[1] (%) | 100 | 0 | 0 | 0 | 0 | 99 | 97 | 94 | 90 | 80 |
| LDPE[2] (%) | 0 | 100 | 97 | 94 | 90 | 0 | 0 | 0 | 0 | 0 |
| Carbon Black[3] (%) | 0 | 0 | 3 | 6 | 10 | 1 | 3 | 6 | 10 | 20 |
| Light-Shielding Property[4] | E | E | C | fisheyes observed B | B | C | C | A | A | A |
| Tear Strength[g] longitudinal | 610 | 810 | 100 | 50 | 30 | 705 | 752 | 794 | 834 | 880 |
| transverse | 817 | 456 | 312 | 250 | 70 | 910 | 980 | 1040 | 1090 | 1120 |
| Hot Seal Property[4] | B | D | D | D | D | B | B | B | B | B |
| Heat Seal Strength (g/15 mm) 180° C. | 630 | 660 | 630 | 600 | 400 | 600 | 630 | 660 | 730 | 650 |
| Gelbo Test Strength[4] | C | E | C | C | | C | B | A | A | A |
| Vibration Amplitude of Bubble | wide | narrow | narrow | narrow | | slightly narrower than R1 | narrow | narrow | narow | narrow |

Prior art films show poor molding properties,

TABLE 1-continued

| | Properties of Single Inflation Films (film thickness 50 μm) | | | | | | | | |
|---|---|---|---|---|---|---|---|---|---|
| | Reference Tests (prior art films) | | | | Films of the Present Invention | | | | |
| Sample No. | R1 | R2 | R3 | R4 | 5 | 6 | 7 | 8 | 9 |
| when 15% carbon black is added. | | | | | | | | | |

Explanation of marks
A = Significantly excellent.
B = Excellent.
C = Practical.
D = Difficulties exist.
E = Obviously poor (or cost high).

Remarks to Table 1
 (1) Ultzex 2020L manufactured by Mitsui Petrochemical Industries, Ltd. MI: 2.5, density: 0.922 g/cm$^3$.
 (2) DFD-0111 manufactured by Nippon Unicar Mi: 2.4, density: 0.923 g/cm$^3$.
 (3) Furnace black having a mean particle size of 21 mμ manufactured by Mitsubishi Chemical Industries Ltd.
 (4) Evaluation common through Tables 1 to 3 are as follows:
  A=significantly excellent
  B=practically or sufficiently excellent
  C=practical
 (5) narrow(=good)←→wide(=bad)

Testing procedures:
 Light-Shielding Properties: evaluated by sensing fog of wrapped low-sensitive film exposed to 80 thousand lux light.
 Hot Seal Properties: evaluated by difficulty in peeling separation of the sealed portion immediately after heat sealing and before having been cooled.
 Tear Strength: according to JIS P8116
 Heat Seal Strength: Sealing of 2 stacked sheet of samples having a width of 1.5 cm is carried out for one second at a temperature of 140° C. and under a pressure of 1 kg/cm$^2$. After completely cooled, a load applied on the sealed samples when they begin to separate is measured (in gram).
 Formation of films in Tables 1 and 2: by inflation molding, Ring die diameter: 100 mm, blow ratio: 1.7, L/D: 22.

Testing Procedure:
 Gelbo Test Strength: According to MIL B 131. A test machine basically comprises a stationary disc (A) and a rotatable disc (B) both of which have a diameter of 87 mm and a thickness of 13 mm. The disc (A) and (B) are placed facing each other separated by a distance of 174 mm. After a sample film is cylindrically wound on both discs (A) and (B) and then fixed thereto, the disc (B) is first forwarded towards the disc (A) by a distance of 89 mm from its original position, and during forwarding, the disc (B) is simultaneously rotated 440 degree. Then, the disc (B) is further forwarded by a distance of 64 mm without rotating. Thereafter, the disc (B) is returned to its original position by an inverse sequence of steps to those described above. One return trip of the disc (A) refers to one bending operation of the sample film. The strength is evaluated from the number of times of the bending operation until the first pinhole occurs, where the bending operation is applied in a speed of 40 times a minute.

TABLE 2

| | Properties of Single Inflation Films of the Polymer Blend Type (film thickness 50 μm) | | | | | |
|---|---|---|---|---|---|---|
| Sample No. | 1 | 2 | 3 | 4 | 5 | 6 |
| L-LDPE[1](%) | 96.5 | 89.5 | 79.0 | 65.0 | 51.0 | 45.0 |
| LDPE[2](%) | 2.5 | 7.5 | 15.0 | 25.0 | 35.0 | 45.0 |
| Carbon Black[3](%) | 1.0 | 3.0 | 6.0 | 10.0 | 14.0 | 10 |
| Light-Shielding Properties[4] | C | B | A | A | A | many fisheyes B |
| Tear Strength[5] longitudinal | 680 | 785 | 910 | 1040 | 980 | 268 |
| transverse | 820 | 882 | 1004 | 1230 | 1020 | 836 |
| Hot Seal Properties[4] | B | B | B | B | B | C |
| Heat Seal Strength g/15 mml 80° C. | 630 | 730 | 750 | 765 | 820 | 660 |
| Gelbo Test Strength[4] | B | B | A | A | A | B |
| Vibration Amplitude of Bubble | Slightly narrower than R1 | narrow | narrow | narrow | narrow | narrow |

Remarks on Table 2:
 (1), (2), (3): Materials same as those in Table 1 are used.
 (4): refer to remark (4) to Table 1
 (5): narrow (good)←→wide (bad)
 %: by weight (Common through Tables 1 to 3)

TABLE 3

Properties of Composite Laminated Films
(composite films shown in FIGS. 3 and 6)
(Flexible sheet layer is: 3: bleached craft paper of 30 g/m$^2$, 4: 15 μm LDPE, 5: 7 μm aluminum foil, 2: 70 μmLDPE, and 7: 50 μm L-LDPE)

| Sample No. | 1 | 2 | 3 | 4 | 5 |
|---|---|---|---|---|---|
| L-LDPE[1] (%) | 0 | 96.5 | 89.5 | 79.0 | 65.0 |
| LDPE[2] (%) | 100 | 2.5 | 7.5 | 15.0 | 25.0 |
| Carbon Black[3] (%) | 3 | 1.0 | 3.0 | 6.0 | 10.0 |
| Thickness of Single Film (μ) | 70 | 50 | 50 | 50 | 50 |
| Total Thickness of Composite Film (μ) | 150 | 130 | 130 | 130 | 130 |
| Light-Shielding Properties[4] | A | B | A | A | A |
| Tear strength (g) transverse | 212 | 301 | 317 | 382 | 468 |
| longitudinal | 157 | 252 | 326 | 366 | 386 |
| Hot Seal Properties[4] | D | B | B | B | B |

TABLE 3-continued

Properties of Composite Laminated Films
(composite films shown in FIGS. 3 and 6)
(Flexible sheet layer is: 3: bleached craft paper of 30 g/m², 4: 15 μm LDPE, 5: 7 μm aluminum foil, 2: 70 μmLDPE, and 7: 50 μm L-LDPE)

| Sample No. | 1 | 2 | 3 | 4 | 5 |
|---|---|---|---|---|---|
| Heat Seal Strength (140° C.) (g/15 mm) | 200 | 1700 | 1900 | 2000 | 2200 |
| Extent of Impact Perforation (Kg · cm) | 5.8 | 9.8 | 10.5 | 10.8 | 10.6 |
| Fold Properties (degree) | 103 | 78 | 75 | 63 | 62 |
| Cost Index | 100 | 85 | 80 | 75 | 70 |

Remarks to Table 3:
(1), (2), (3): same as Table 1
(4): same as remark (4) to Table 1

Testing Procedures:
Extent of Impact Perforation: measured in accordance with JIS P8134
Unit: kg.cm
Fold Properties: A film having a 5 cm width is folded and applied with 1 kg load on the fold. Recovered angle from the folded state is measured immediately after removal of the load.

The packaging film of the present invention is suitable for packaging generally light-sensitive material particularly light-shielding paper for photographic rollfilm. The term "light-sensitive material" includes photo-sensitive materials such as silver halide photosensitive materials, diazo photosensitive materials, photosensitive resins, self-developing photosensitive materials, diffusion-transfer type photosensitive material and other materials which may change the color, cure or deteriorate in response to light.

Specifically the light-sensitive materials include foods such as chocolate, margarine, fermentation products such as Miso, wine, beer or the like, medicines, dyes and other chemical materials such as developing solution and mordants for dying and the like.

The film may attain a form like a pillow shaped bag as disclosed in Japanese Utility Model Kokai-Publication No. 56-128855 or may be used as light-shielding paper for a Browny film.

The packaging film of the present invention may be used either as a single light-shielding film comprising a light-shielding material and a polyethylene polymer, or as a composite (laminated) film comprising this light-shielding film and the other packaging material(s).

The other packaging material(s) which is (are) used for the composite film include(s) films of thermoplastic resin, flexible sheets and the like. The thermoplastic resin encompasses such as various kinds of polyethylene, polyethylene copolymer resin, polypropylene, polyvinyl chloride, polyvinylidene chloride, polyamide, polycarbonate, fluoroplastics, polyesters, modified resins of those resins, or the like.

The flexible sheets are also preferable and encompass other cellulose acetate film, cellophane, polyvinyl alcohol film, paper, aluminum foil, bonded fabric, cross laminated airly fabric, foamed sheets of polyethylene, polystylene, polyurethane or the like.

One or combination of two or more of the materials hereinabove mentioned may be used.

Lamination of the other packaging materials with the polyethylene film of the present invention is accomplished by conventional manners such as thermal bonding processes (e.g., thermal plate bonding, impulse bonding and ultrasonic bonding), adhesion (e.g., wet and dry laminating, hot melt laminating, extrusion laminating) co-extrusion process or the like. A composite film for packaging having sufficient physical strengthes and tear easiness may be obtained provided that aluminum foil is used as the other packaging materials.

EXAMPLES

The present invention will be described by way of examples with reference to drawings. However, the examples are presented for better understanding of the invention but not for limitation thereof and any modifications apparent in the art would be made without departing from the concept and scope of the claims of the present invention.

Figure 2:
Figure 3:
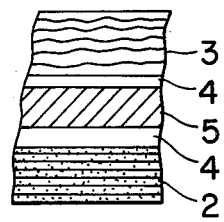

A conventional L-LDPE transparent film 1 as shown in FIG. 1 had difficulties in film formation. A conventional LDPE film 2 containing a light-shielding material is shown in FIG. 2. The film 2 had a drawback in that the film strength is lowered by incorporation of the light-shielding material. FIG. 3 shows a typical example of conventional laminated film used for packaging light-sensitive materials. The film comprises a light-shielding LDPE layer 2, an aluminum foil 5, and a flexible sheet 3 such as paper and cellophane which have been bonded each other by an adhesive 4. Although the three-layer structure provides light-shielding properties and strengths superior to those of usual film, it is thick and bulky and cost-consuming. The paper of the flexible sheet 3 is provided for increasing tear strength and the aluminum foil 5 is provided for improving moisture shielding properties and antistatic properties.

Figure 4:
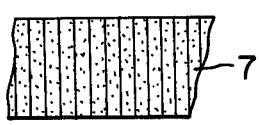
FIGS. 4 to 15 are sectional views showing examples of films for packaging light-sensitive materials according to the present invention.

FIG. 4 shows a packaging film 7 of the present invention, this film being a simplest single film and the basic one of the present invention. The film 7 comprises L-LDPE incorporating a light-shielding material. Addition of the light-shielding material will not reduce the physical properties. On the contrary, since it will enhance them, the amount of the light-shielding material can be increased if necessary. The addition of the light-shielding material will also improve the processing properties. Existing film molding machines are applicable to L-LDPE which has been mixed with LDPE without any particular changes. This film is superior to the film as shown in FIG. 1 with respect to the light-shielding ability, strength and manufacturing cost.

Figure 5:
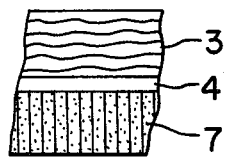

FIG. 5 shows an example of a laminated film comprising a flexible sheet 3 of paper or cellophane and L-LDPE 7 to which a light-shielding material is added. The sheet 3 and the L-LDPE 7 are bonded with an adhesive 4.

Figure 6:
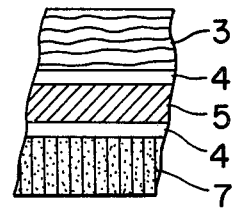
Figure 7:
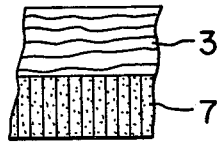

FIG. 6 shows a three-layered film analogously with the film shown in FIG. 3. FIG. 7 shows a laminated film analogous with that shown in FIG. 5 except that the adhesion layer 4 is removed. The film is made by directly extrusion-coating an L-LDPE layer on the flexible sheet 3, or by co-extruding the other thermoplastic resin layer 3 with L-LDPE.

Figure 8:
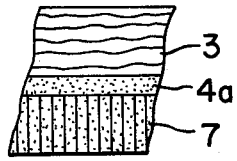
Figure 9:
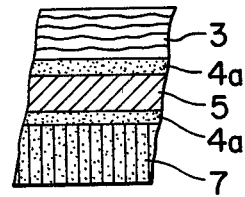

Films shown in FIGS. 8 and 9 are such that an adhesive layer is also added with a light-shielding material to those films as shown in FIGS. 5 and 6, respectively. The light-shielding properties of the film as a whole can be improved by the combination of different light-shielding materials which are effective for different light wavelength ranges.

Figure 10:
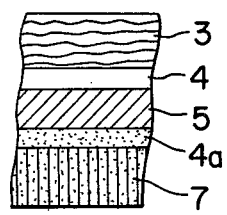

A film shown in FIG. 10 is identical with that shown in FIG. 9 except that one of adhesive layers comprises no light-shielding material.

Flexible sheet 3 which contains no light-shielding material has bonding properties better than that containing light-shielding material if the flexible sheet 3 is made of cellophane.

Figure 11:
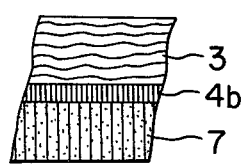

A film shown in FIG. 11 is identical with that shown in FIG. 8 except that a layer 4b is made of an adhesive of an L-LDPE base. This film is very suitable for the film for packaging high-sensitive photograhic materials which require very excellent light-shielding properties since lowering of bonding strength of an L-LDPE type adhesive 4b is small in spite of addition of a greater amount of the light-shielding material than in the adhesive 4a.

Figure 12:
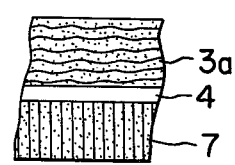
Figure 15:
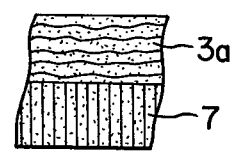

Composite films shown in FIGS. 12 and 15 are identical with those of FIGS. 5 and 7, respectively, except that a flexible sheet 3a is added with a light-shielding material. The light-shielding properties may be improved by addition of a light-shielding material into a flexible sheet when the material to be packed with this film is very sensitive.

Figure 13:
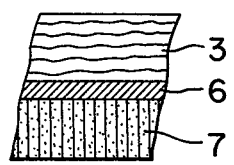

FIG. 13 shows a laminated film comprising a flexible sheet 3, an aluminum layer 6 deposited on the sheet 3 whereupon a light-shielding material added L-LDPE layer 7 is directly coated by extrusion coating.

Figure 14:
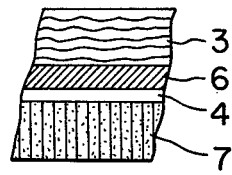

FIG. 14 shows a film laminated with an adhesive. Although the aluminum deposited layer is thinner than the aluminum foil, it has excellent light-shielding properties, moisture- and gas-shielding properties, and antistatic properties. It is not bulky and has excellent processing properties.

While preferred embodiments of the film for packaging light-sensitive material according to the present invention has been described using specific terms, such description is for illustrative purposes only, and it is to be understood that combination with the other known materials is possible without departing from the spirit of the invention and scope of the accompanying claims.

The flexible sheet may include paper, colored paper, synthetic paper, cellophane, bonded fabric, foamed sheet of polyethylene, polystyrene, polyurethane or the like, paperboard, K-liner, various thermoplastic resin films, triacetate film, diacetate film, polyvinyl alcohol film, metal deposited paper or the like.

The adhesive includes extrusion laminate type adhesives comprising thermoplastics such as various kinds of polyethylene, ethylene-ethyacrylate copolymer, ethylene-vinyl acetate copolymer, L-LDPE, polypropylene, ionomer and the like; water soluble adhesives, solvent type adhesives, hot melt type adhesives and the like.

What is claimed is:

1. A film for packaging light-sensitive materials having at least one light-shielding film comprising polyethylene polymer and further comprising 1-30 weight % light shielding material therein, wherein not less than 50 weight % of the total polyethylene polymer is linear low density polyethylene (L-LDPE) which is a copolymer of ethylene and an alpha olefin of 3 to 13 carbon atoms.

2. The film as defined in claim 1, wherein the total thickness of the film for packaging light-sensitive materials is 58-130 microns.

3. A film for packaging light-sensitive materials having at least one light-shielding film comprising polyethylene polymer and further comprising 1-30 weight % light shielding material therein, wherein not less than 50 weight % of the total polyethylene polymer is linear low density polyethylene (L-LDPE) which is a copolymer of ethylene and an alpha olefin of 3 to 13 carbon atoms, and at least one additional layer selected from the group consisting of thermoplastic resin film, paper, colored paper, synthetic paper, cellophane, bonded fabric, foamed sheet, paper board, K-liner, triacetate film, diacetate film, polyvinyl alcohol film, metal disposited paper, and aluminum layer.

4. The film as defined in claim 3, wherein said aluminum layer is an aluminum foil.

5. The film as defined in claim 3, wherein said aluminum layer is a deposited aluminum layer.

6. The film as defined in claim 3, wherein the light-shielding film and the additional layer are formed by coextrusion.

7. The film as defined in claim 3, wherein the addiitional layer is formed by extrusion.

8. The film as defined in claim 3, wherein said α-olefin approximately amounts to 0.5-10 weight % of L-LDPE.

9. The film as defined in claim 1 or 3, wherein said α-olefin has 4-10 carbon atoms.

10. The film as defined in claim 1 or 3, wherein said α-olefin is at least one of the group consisting of 1-butene, 1-octene, 1-hexene and 4-methyl-1-pentene.

11. The film as defined in claim 1 or 3, wherein L-LDPE approximately has a density of 0.91-0.95 g/cm$^3$.

12. The film as defined in claim 1 or 3, wherein the light-shielding material is present in an amount of 3-10 weight % in the light-shielding film.

13. The film as defined in claim 1 or 3, wherein the light-shielding film is produced by inflation molding.

14. The film as defined in claim 1 or 3, wherein the light-shielding film is produced by extrusion.

15. The film as defined in claim 1 or 3, wherein the balance of said polyethylene polymer other than L-LDPE is high pressure low density polyethylene (LDPE).

16. The film as defined in claim 15, wherein LDPE is present in the amount of 5-25 weight % in the polyethylene polymer.

17. The film as defined in claim 1 or 3, wherein the L-LDPE is present in the amount of 60-97 weight % of the polyethylene polymer.

18. The film as defined in claim 17, wherein the L-LDPE is present in the amount of 80-90 weight % in the polyethylene polymer.

19. The film as defined in claim 3, wherein an adhesive is used for lamination.

20. The film as defined in claim 19, wherein said adhesive contains light-shielding material.

21. The film defined in claim 3, wherein said flexible sheet contains light-shielding material.

22. The film as defined in any of claim 1, 3, 19, 20 or 4, wherein said light-shielding material is non-light-transmitting powder or particle material dispersed in said polyethylene polymer.

23. The film as defined in claim 22, wherein said light-shielding material comprises inorganic and/or organic pigment(s).

24. The film as defined in claim 23, wherein said pigment(s) comprise(s) one or more selected from the group consisting of carbon black, iron oxide, zinc white, titanium oxide, aluminum powder, aluminum paste, calcium carbonate, barium sulfate, chrome yellow red iron oxide, cobalt blue, copper phthalocyanine, monoazo- and polyazo-compounds, and aniline black.

25. The film as defined in claim 24, wherein the pigment(s) comprise(s) at least carbon black.

* * * * *